United States Patent [19]
Zipin

[11] 3,939,704
[45] Feb. 24, 1976

[54] MULTI-AXIS LOAD CELL
[75] Inventor: Richard B. Zipin, Englewood, Ohio
[73] Assignee: The Bendix Corporation, Southfield, Mich.
[22] Filed: Aug. 7, 1974
[21] Appl. No.: 495,364

[52] U.S. Cl. ............................. 73/133 R; 336/30
[51] Int. Cl.² ........................................ G01L 5/16
[58] Field of Search ................. 73/133 R; 336/30

[56] References Cited
UNITED STATES PATENTS

| | | | |
|---|---|---|---|
| 3,114,124 | 12/1963 | Miller | 336/30 |
| 3,434,342 | 3/1969 | Kazmarek | 73/133 R |
| 3,490,059 | 1/1970 | Paulsen et al. | 73/133 R |
| 3,493,906 | 2/1970 | Zetterberg | 336/30 |
| 3,693,425 | 9/1972 | Starita et al. | 73/133 R |

FOREIGN PATENTS OR APPLICATIONS

| | | | |
|---|---|---|---|
| 213,387 | 11/1968 | U.S.S.R. | 73/133 R |
| 272,618 | 5/1971 | U.S.S.R. | 73/133 R |

*Primary Examiner*—Charles A. Ruehl
*Attorney, Agent, or Firm*—John R. Benefiel

[57] ABSTRACT

A load cell capable of measuring forces along three orthogonal axes as well as bending moments about each of these axes is disclosed which is of simple construction while being capable of measuring accurately a wide range of dynamic working loads. The load cell consists of a housing drivingly connected to a central hub member by means of a cross pattern formed by pairs of compliant cantilever bars, each bar slidable in the housing along its axis so as to not be capable of resisting transverse loads along respective orthogonal axes in the plane transverse to the load cell. Displacements of the hub relative to the housing are measured by four sets of LVDT transducers, each set measuring relative lateral movement parallel to each of the orthogonal axes on opposing points radially displaced from the central axis of the load cell. These displacements are used to generate signals corresponding to the force components along each of the orthogonal axes as well as bending moments about each of these axes.

7 Claims, 5 Drawing Figures

MULTI-AXIS LOAD CELL

BACKGROUND OF THE INVENTION

1. Field of the Invention

This invention relates to load cells, more particularly to multiaxis load cells capable of measuring forces and moments about three orthogonal axes.

2. Description of the Prior Art

Multi-axis load cells have long been available for various purposes, typical examples being found in U.S. Pat. Nos. 3,640,130; 3,433,064; 3,600,942; 3,492,864; 3,513,457; 3,513,431; 3,693,425; 3,552,199; 3,427,875; and 3,618,376. The use of multi-axis load cells has been heretofore been proposed in the context of automated assembly operations in which a manipulator device is controlled so as to perform certain assembly tasks by means of so-called "force feedback steering" in which the reactive forces transmitted back through the manipulator as the assembly task is carried out are used to generate control signals to perform the assembly task. Such an application requires a load cell having simple, lightweight physical structure and in addition must be capable of functioning over a wide range of dynamic load levels since very lightweight parts, i.e., washers, pins, etc., and relatively heavy objects, i.e., castings, etc., and may be expected to be handled by the manipulator, and the reactive loads may also vary widely depending on the dynamic nature of the specific assembly task being performed. Studies to date have also indicated that for such force feedback steering to be effective force levels along each of the orthogonal axes and bending moments about each of these axes must each be measured quite accurately. An approach to multiaxis load cells suitable to this application has been described in a published Master's Thesis entitled "Force Feedback Steering of a Tele-Operator System" by R. C. Groome, Jr., MIT Draper Laboratory Report T-575, August, 1972. This arrangement consists of a hub connected to a housing by means of four cantilever bars arranged in a cross pattern, each of the bars being fixed to the housing while being supported so as to be slidable along its axis with respect to the housing. Resistive strain gages are applied to each of these bars so as to measure the lateral forces experienced by each of the cantilever bars. As described therein, the forces so sensed may be resolved to obtain the three force and three torque components experienced by the load cell.

While this approach is extemely simple and effective, the use of resistive foil strain gage elements on the cantilever bars to measure the forces limits the dynamic range of load levels which are capable of being measured by the assembly since the resolution of strain gages of this type is quite limited.

Therefore, it is an object of the present invention to provide a load cell which is both simple and is capable of sensitively measuring multi-axis loads along a wide dynamic range of load levels.

SUMMARY OF THE INVENTION

This object and others which will become apparent upon a reading of the following specification and claims is accomplished according to the present invention by modifying the cross bar load cell described by the addition of a spider and hub structure to the central hub member, and supporting four pairs of displacement transducers in the housing to measure lateral displacements of each of radially opposite points on the spider and hub with respect to the housing along orthogonal axes, from which displacement measurement signals corresponding to each of the major forces and bending moments are generated.

DETAILED DESCRIPTION

Figures 1, 2, 3:
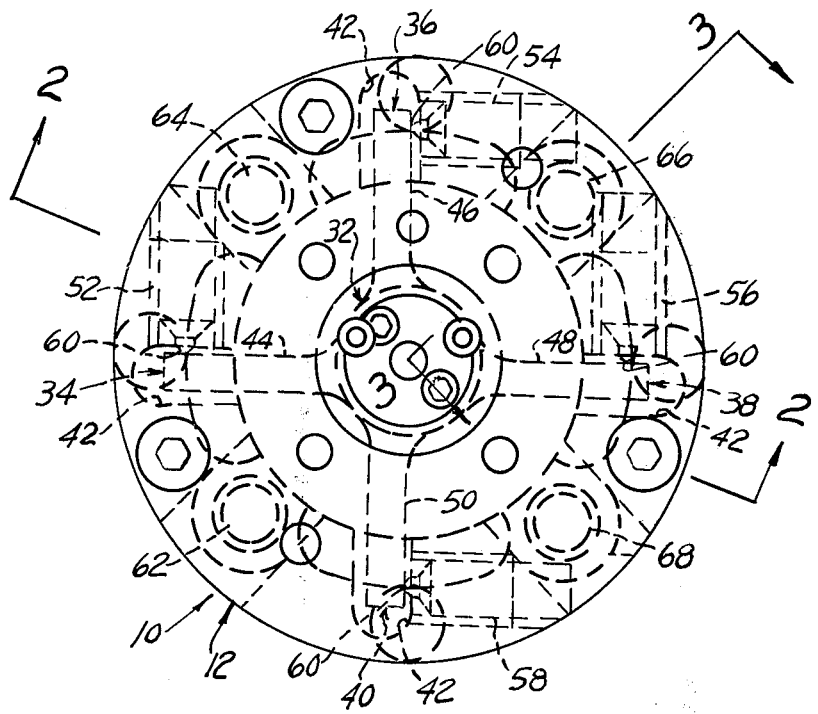
FIG. 1 is a plan view of a multi-axis load cell according to the present invention.
FIG. 2 is a sectional view taken along the lines 2—2 of FIG. 1.
FIG. 3 is a sectional view taken along the lines 3—3 of FIG. 1.
Figure 4:
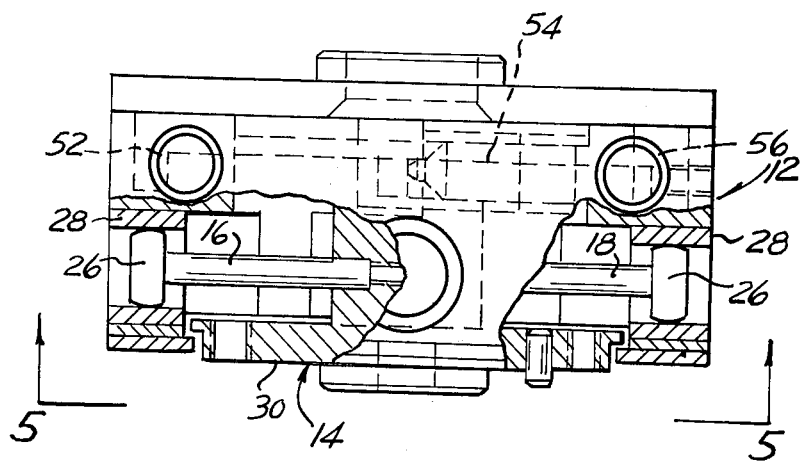
FIG. 4 is an elevational view of the multi-axis load cell according to the present invention in partial section.
Figure 5:
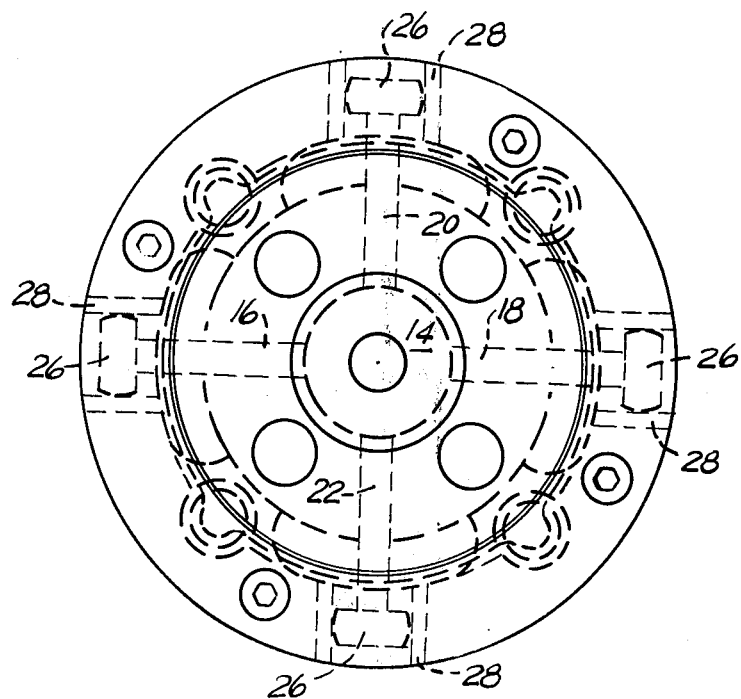
FIG. 5 is a plan view of the multi-axis load cell taken in the direction of the arrows 5—5 in FIG. 4.

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

One example would be the use of three cantilever bars arranged at 120° and six LVDT transducers rather than 4 and 8 to obtain the six components of force and moment.

Referring to the drawings, the load cell 10 includes a housing member 12 and a hub member 14 supported within the housing 12 and drivingly connected thereto by means of four cantilever bars 16, 18, 20 and 22 which are fixed at one end to a central portion 24 of the hub 14. The other ends are supported in the housing 12 by means of four partially spherical ball ends 26 slidably fit within bushings 28, so as to freely allow relative movement between each cantilever bar and the housing 12 in directions along each bar axis.

In order to measure the various displacements relative to the housing 12 of radially spaced points fixed with respect to the hub 14, the hub 14 is provided with a flange member 30 and a spider member 32, each affixed to opposite respective ends of the hub 14.

Spider 32 includes four radially extending arms 34, 36, 38 and 40 each extending into clearance recesses 42 formed in housing 12, the recesses 42 providing an overtravel positive stop for the arms 34–40. The spider arms 34–40 each have a lateral edge 44, 46, 48 and 50 lying along axes crossing the central axis of the load cell.

Lateral movement of each of these edges 44–50 is detected by means of displacement transducers, preferably 52, 54, 56 and 58 carried in the housing 12 and positioned such as the contact tips thereof 60 are maintained in engagement with a respective edge 44–50. These transducers are preferably of the linear variable differential transformer type, which perform well in this application, since very accurate displacement measurement can be carried out over a range which is much larger compared to strain gage applications.

Such LVDT transducers are per se well known in the art and commercially widely available and so will not be described herein in detail. Suffice it to say that any movement of the contact tip 60 generates an electrical output signal corresponding precisely to the extent of such movement.

This arrangement provides a means for sensing relative displacements between the hub 14 and the housing 12 in directions parallel to the axis of the cantilever bars 16, 18, 20 and 22.

Lateral movement of the flange 30 along lines parallel to the axis of the load cell 10 is measured by means of LVDT transducers 62, 64, 66 and 68, also carried in the housing 12 and positioned so as to engage the outer rim 70 of flange 30 at 90° intervals about the circumference thereof. The outer rim 70 is positioned so as to engage portions 71 and 73 of the housing 12 to provide an overtravel positive stop.

This arrangement provides a means for sensing relative displacements of the hub 14 and the housing 12 in directions orthogonal to a plane formed by the cantilever bars 16, 18, 20 and 22.

As will be appreciated by those of ordinary skill in the art from this description, signals corresponding to lateral displacements of the hub member 14 at the eight points described are generated which may be used to produce signals corresponding to the major force components along each of the orthogonal axes and the bending moments about each of these axes.

Each transducer set comprised of each radially opposed pair provides both a means of meaasuring a force component along the axis parallel to the LVDT's in the set and also is a means of measuring the bending moment applied to the orthogonal axis transverse to the plane in which the particular LVDT pair axes are located, since the algebraic summation of the displacements measured by the LVDT pair uniquely defines this bending moment, as can be appreciated by one of ordinary skill in the art.

The electrical signals so produced can thus be combined and processed in this manner by known circuitry techniques to generate signals corresponding to each of the force components and bending moments for use in the controller system.

As is well known in the transducer art, these LVDT transducers are capable of extremely accurate displacement measurements or a range of displacements which is considerable by comparison to strain measurements capable of being measured by strain edge gage type instrumentation. These transducers also have excellent dynamic measurement characteristics so that it can be appreciated that the simplicity of the load cell approach described by Groome, Jr., has been retained while adding the performance characteristics described.

While the interpretation shown here has the spider 32 and flange 30 displaced from the plane of the cantilever bars 16–22 primarily for ease of manufacture, it should be appreciated that these three planes could be made coincident so that the cantilever bars and the contact tips of the 8 (or 6) LVDT's are all in the same plane, in order to minimize cross coupling of signals generated by displacement of each. Also the cantilever bars are made of round cross section. If it is desired to have different stiffnesses, the bar sections could be rectangular or of some other shape to tailor the stiffnesses in the various directions to the particular application.

Many variations of this concept are of course possible within the scope of the present invention.

What is claimed is:

1. A multi-axis load cell comprising:
 a housing member,
 a hub member;
 means drivingly connecting said hub and said housing including a plurality of cantilever bars extending between said hub and said housing and connecting means therefor, said connecting means fixing one end of each cantilever bar to one of said hub and said housing and freely connecting the other end of each bar to the other of said hub and said housing to allow relative movement therebetween in a direction along each respective cantilever bar axis; and
 means sensing relative displacements between said hub and said housing in directions parallel with the axes of said cantilever bars and producing signals corresponding thereto, whereby forces corresponding to said displacement can be measured.

2. The load cell of claim 1 wherein said means sensing relative displacements between said hub and said housing in directions parallel with the axes of said cantilever bars includes a plurality of LVDT transducers sensing said relative displacements.

3. The load cell of claim 1 wherein said means sensing said relative displacements between said hub and said housing in directions parallel to the axes of said cantilever bars includes a spider member fixed to said hub and having a plurality of arms extending radially from said hub, said means sensing relative displacements between said hub and said housing in directions parallel to the axes of said cantilever bars further including means sensing displacement of a point on each of said arms.

4. The load cell of claim 1 further including means sensing relative displacements of said hub and said housing in directions orthogonal to a plane formed by said cantilever bars and including a flange member fixed to said hub member extending radially with respect to said hub.

5. The load cell of claim 4 wherein said means sensing said relative displacements between said hub and said housing in directions parallel to the axes of said cantilever bars includes a spider member fixed to said hub and having a plurality of arms extending radially from said hub, said means sensing relative displacements between said hub and said housing in directions parallel to the axes of said cantilever bars further including means sensing displacement of a point on each of said arms.

6. The load cell of claim 5 wherein said means sensing displacement includes a plurality of LVDT transducers engaging said points on said spider member, and said flange member.

7. The load cell of claim 4 wherein said means sensing relative displacements between said hub and said housing in directions orthogonal to a plane formed by said cantilever bars includes a plurality of LVDT transducers engaging said flange member.

* * * * *